United States Patent [19]

Faulkner et al.

[11] 4,339,247

[45] Jul. 13, 1982

[54] ACOUSTIC DEGASIFICATION OF PRESSURIZED LIQUIDS

[75] Inventors: Lynn Faulkner, Gahanna; Foster B. Stulen, Columbus, both of Ohio

[73] Assignee: Battelle Development Corporation, Columbus, Ohio

[21] Appl. No.: 257,800

[22] Filed: Apr. 27, 1981

[51] Int. Cl.³ .............................................. B01D 19/00
[52] U.S. Cl. .......................................... 55/15; 55/38; 55/52; 55/159; 55/277; 210/748
[58] Field of Search ................... 55/15, 36, 52, 159, 55/277, 292, 38; 210/748; 209/1

[56] References Cited

U.S. PATENT DOCUMENTS

| | | | |
|---|---|---|---|
| 2,376,221 | 5/1945 | Baker | 55/15 |
| 2,565,159 | 8/1951 | Williams | 171/327 |
| 2,620,894 | 3/1952 | Peterson et al. | 183/114 |
| 2,766,881 | 10/1956 | Westervelt et al. | 210/748 |
| 2,960,317 | 11/1960 | Bodine | 259/1 |
| 3,076,544 | 2/1963 | Bodine, Jr. | 209/1 |
| 3,109,721 | 11/1963 | Zenner et al. | 55/15 |
| 3,151,958 | 10/1964 | Bodine | 55/15 |
| 3,200,567 | 8/1965 | May | 55/277 |
| 3,229,448 | 1/1966 | Jacke | 55/277 |
| 3,266,631 | 8/1966 | Snaper | 210/542 |
| 3,284,991 | 11/1966 | Ploeger et al. | 55/15 |
| 3,527,611 | 9/1970 | Newfarmer | 134/6 |
| 3,761,732 | 9/1973 | Ratcliff | 55/277 |
| 4,042,034 | 8/1977 | Cook et al. | 166/314 |
| 4,149,596 | 4/1979 | Richardson et al. | 166/267 |
| 4,168,295 | 9/1979 | Sawyer | 422/111 |
| 4,261,419 | 4/1981 | Probstein et al. | 166/52 |

FOREIGN PATENT DOCUMENTS

| | | | |
|---|---|---|---|
| 500271 | 4/1937 | United Kingdom | 55/277 |
| 953826 | 4/1964 | United Kingdom | 55/159 |
| 553991 | 5/1977 | U.S.S.R. | 55/277 |

OTHER PUBLICATIONS

R. Esche and P.L. Langer, "Ultrasonic Equipment for Chemical Production Processes", *Siemens Review* 5, 147, (1960).

*Primary Examiner*—David L. Lacey
*Attorney, Agent, or Firm*—Gerald R. Black

[57] ABSTRACT

Described herein is an acoustic degasification process for separating dissolved gases from hydropressured or geopressured liquids. The liquid and the dissolved gas flow through a hollow chamber that is vibrated utilizing acoustic energy so as to focus the acoustic energy near the center of the hollow chamber, and by the process of rectified diffusion bubbles form and grow within the liquid, wherein buoyancy forces cause the enlarging bubbles to migrate to the surface of the liquid.

7 Claims, 8 Drawing Figures

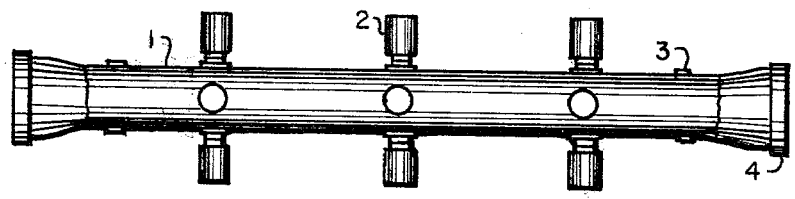
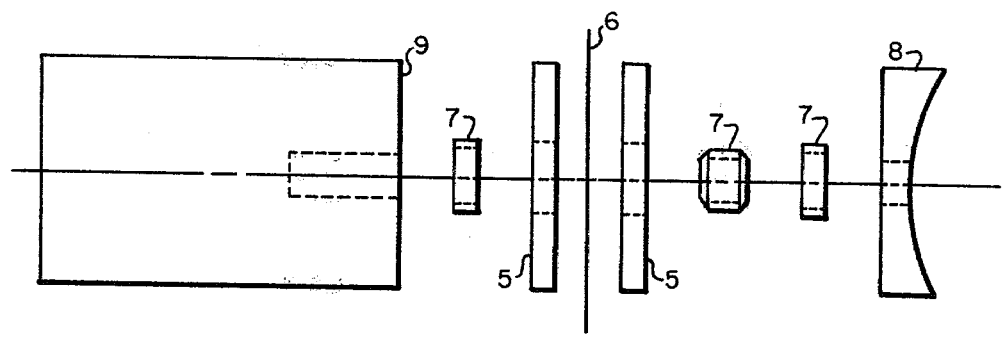
FIG. 1
FIG. 2
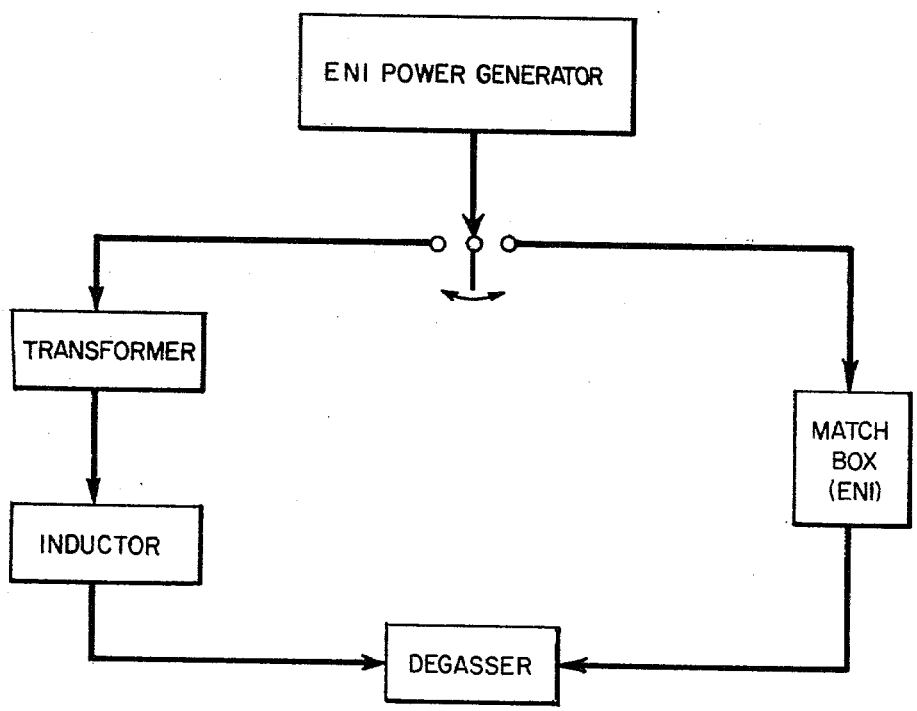
FIG. 3

Results for Power Levels (numbers by curves indicate power in watts)

Initial Removal Rate as a Function of Power.

ACOUSTIC DEGASIFICATION OF PRESSURIZED LIQUIDS

DESCRIPTION OF THE PRIOR ART

Rectified diffusion is a mass transport process by which dissolved gases are driven into pulsating bubbles. The pulsations are the result of an acoustic field imposed on the gas-liquid system. When an acoustic field is applied to a fluid, there is a sinusoidal variation in the pressure about the existing hydrostatic pressure. During the compression phase, the bubble contracts. The reduced volume in the bubble causes the concentration of gas to increase which tends to drive gas out of the bubble and back into the liquid. During the rarefaction phase the bubble expands and the gas concentration decreases, which tends to drive gas into the bubble. Rectified diffusion is a threshold process. When the pressure variation is above a certain value, the gas bubble grows. Below that level, the gas is driven back into solution. Bubbles grow and coalesce into larger bubbles whereas the rate of absorption into the fluid during compression is much slower than the rate of bubble growth during rarefaction. Other factors that affect this threshold value are: the hydrostatic pressure, bubble radius, and frequency of oscillation. Rectified diffusion is also strongly dependent on the properties of fluid being processed.

This basic process has been proposed for the degasification of various liquids including water, oils, viscous fluids, and molten materials. Nevertheless, this technology has been restricted to laboratory use with little commercial application because of system design limitations.

Much of the prior art uses flat surface transducers centered within the chamber. Bubbles form on the surface of the flat transducers which cause an acoustical impedance mismatch between the transducer and the liquid and interferes with the transfer of energy from the transducer to the liquid. Therefore, rectified diffusion with a flat transducer can occur only near the radiating surface. Even if the power is increased, the volume of liquid undergoing rectified diffusion remains relatively unchanged because the sound cannot pass through the initial bubble layer.

Another important consequence of rectified diffusion is the erosion that accompanies it whenever vaporous cavitation occurs on a solid surface. If bubbles form and collapse near a solid surface, the surface pits and erodes away. This is known as cavitation damage. The erosion rate would be high in a hot brine from geopressured aquifers, with its elevated temperature, ionic salts, and suspended particles accelerating the process. Thus, the life of a flat transducer operating in brine is expected to be extremely short. Published data suggest surface damage within minutes of operation.

While the industrial applications of acoustic degassing have been heralded for many years, relatively few actual flowing systems have been developed. Siemens Schukertwerke, A. G., has developed one of the few large scale fluid treatment system using piezoelectric cylindrical transducers. Esche and Langer have reported that the system can be operated in either the thickness or radial mode, depending on the application [Siemens Review 5, 147 (1960)]. The system can process as much as 600 liters per hour which would correspond to 91 bbl/day. Even this relatively large system for piezoelectric transducers is still orders of magnitude smaller than that required for a production well processing 40,000 bbl/day or more of brine. This system consisted of 24 ceramic cylinders arranged in a series configuration. The configuration requires a pressurized cooling system that is not needed for the degasser design. The liquid being processed was not passed through the entire cross section of the cylinder. Rather, a thin-walled tube placed in the center of the cylinders contained the fluid. Cooling liquid was then passed through the remaining interior and exterior of the cylinders.

FIELD OF THE INVENTION

The present invention relates to a novel method for degassing liquids. More particularly the invention relates to separating dissolved gases from the liquid by applying focused acoustic energy to cause rectified diffusion within the liquid which causes small bubbles of the dissolved gas to coalesce and grow. Buoyancy forces cause the enlarging bubbles to migrate to the surface of the liquid. Although the invention was designed primarily for use in removing dissolved hydrocarbons from a water or brine solution, the invention or simple modifications thereof can also be used to recover gases from liquid, or to purify liquids, or both, some examples being to degas vegetable oils, viscous fluids, hydraulic fluids, molten plastic, molten glass, molten steel, and photographic chemicals.

SUMMARY

The invention will overcome the disadvantages of the prior art by directing acoustic energy into a hollow chamber through which the liquid passes containing the dissolved gases. The chamber may be a pipe, a sphere, or some other shaped holding vessel. The process is well suited for both continuous, flow-through operation or batch type operations. This degasser is basically a hollow chamber with acoustic transducers mounted on the outside wall. The design concept of this degasser has several advantages. It is relatively simple to construct. The hollow chamber can be chosen to withstand the normal operating pressures, temperatures, and corrosiveness of the production well brine. This configuration provides a simple and efficient system.

The acoustic transducers utilize piezoelectric crystals and convert an electric signal into a mechanical vibration. The crystals most commonly used are quartz, lead-zircon-titanate, ammonium dihydrogen phosphate, Rochelle salt, and barium titanate. The vibration frequency is selected and adjusted to promote efficient rectified diffusion, that is, so that small bubbles form within the center portion of the hollow chamber and grow about nuclei within the liquid. The system will focus the acoustic energy with peak intensity occurring near the center of the hollow chamber thereby avoiding cavitation on the inside chamber wall surface. Mechanical means are used to separate the enlarging bubbles as they migrate to the surface of the liquid. A group of transducers are attached to the hollow chamber in a circular arrangement as shown in FIG. 1. Although three groups of four such transducers are shown, any number may be used. The spacing of these transducers in the longitudinal direction along the hollow chamber is critical. Best results are obtained when the transducers are placed at antinodal locations in the same phase of the hollow chamber, and are tuned so that they resonate at the same frequency as the chamber.

Although the system is designed to operate in the frequency range of from 100 to 500,000 cycles/second, the preferred range is 10,000 to 50,000 cycles/second.

One major advantage is that the invention can operate at atmospheric pressure or at pressures significantly above atmospheric, up to or exceeding 4000 psig. This is extremely important for separating dissolved gases from hydropressured, or potentially geopressured liquids. Much energy is wasted if these liquids, water, brine, or crude oil, must be brought to atmospheric pressure where the liquid is degassed by flashing, and then the liquid is repressurized for subsurface disposal.

Another advantage is that the invention may be utilized when there is more than one gas dissolved in the liquid. When two gases are dissolved in solution and processed through the invention, the gases are removed from the solution sequentially, one at a time. The solution must be reprocessed to remove other dissolved gases. It is suspected that the first gas to come out of solution depends upon the relative concentration of the gases, diffusion constants, partial pressures, ambient pressure, and acoustic energy levels. In preliminary tests methane and air were both dissolved in water. The methane was 90 to 100 percent removed before the air came out of the water.

Another advantage of the invention is that it may be the primary method of removing the dissolved gases, it may operate in conjunction with conventional degassing equipment, or it may be used with successive units in a series to improve operating efficiency. When units are used in a series, different frequencies are preferred for successive units, where the frequencies selected depend upon the bubble size in the flow direction. Frequencies are lower for larger size bubbles. Also, successive degasser units may be tuned at different operating parameters (e.g. frequency, power) to better separate different gases from solution.

These and other advantages will become readily apparent to those skilled in the art based upon the disclosure herein contained.

BRIEF DESCRIPTION OF THE DRAWINGS

FIG. 1 is a diagram of a preferred embodiment of the degasser.

FIG. 2 is an assembly diagram of the acoustic transducer.

FIG. 3 shows a block diagram of an empirical approach of matching the power generator to a degasser.

DESCRIPTION OF PREFERRED EMBODIMENTS

Figure 4:
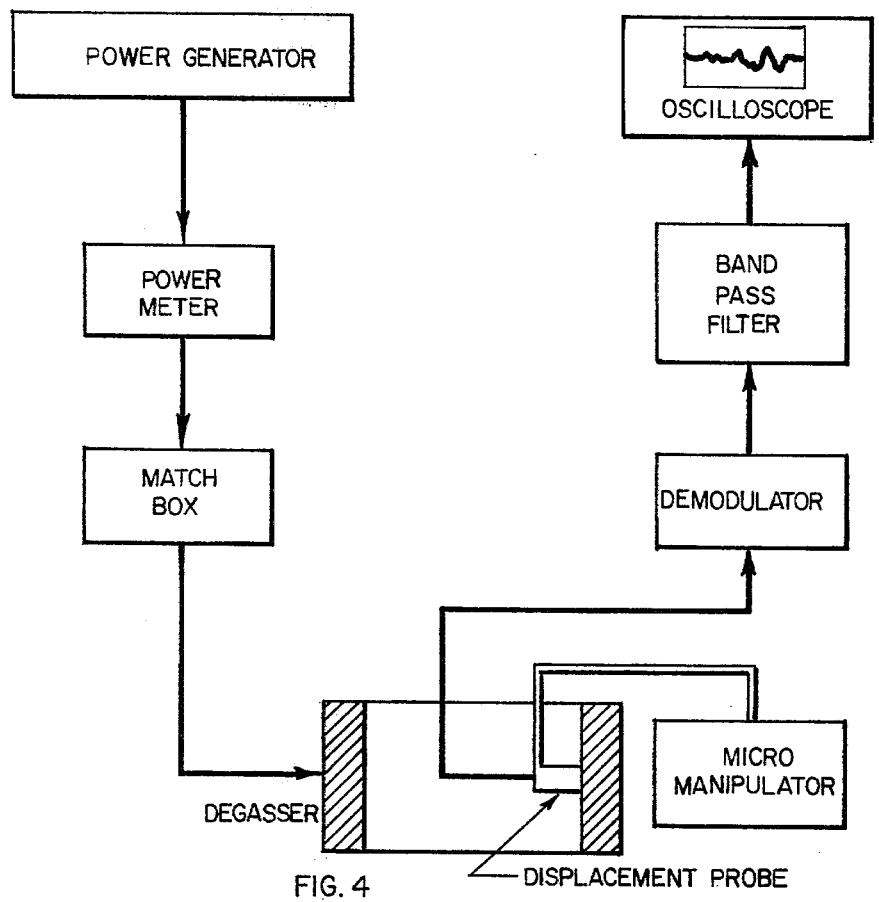
FIG. 4 shows a block diagram of the equipment used to determine the acoustic displacements of the degasser.

In general, this invention comprises a method of removing dissolved gas from pressurized liquids by using acoustic energy. Acoustic transducers are attached to the outside surface of a hollow chamber. Although the testing apparatus selected is a pipe, such selection was made because of convenience, and not because the apparatus operates better than other geometries. Similarly, although the design involves a continuous flow through system, the invention also operates in a batch mode. Tuning of the degasser and focusing the acoustic energy are major factors in this new process. Tuning involves the matching of the frequencies of the acoustic transducers including the piezoelectric crystals, the reactions masses and the power supply, and the hollow chamber containing the liquid so that the degasser operates in resonance. Focusing occurs when the hollow chamber vibrates thereby directing the generated acoustic energy toward the center of the hollow chamber, whereas the acoustic energy generated at the inside wall surface of the chamber is minimized.

A degassing apparatus for practicing the inventive method is shown in FIG. 1 and FIG. 2. The apparatus consists of a pipe 1, suitable mounting elements 4, and a plurality of transducers 2 arranged about the outside surface of the pipe. A driver is a transducer that delivers power to the hollow chamber. To mount the drivers consisting of piezoelectric disks 5, silver solder saddles 8 can be machined to the pipe. The piezoelectric disks are model #PZT-4 ceramic, a standard line of products manufactured by the Vernitron Piezoelectric Division in Bedford, Ohio. One reaction mass 9 is attached to each set of piezoelectric disks. Two nuts 3 are located at both ends of the pipe. Eyebolts are screwed into the nuts for convenient mounting of the degasser. By placing these nuts at nodes the support should have a minimal effect on the resonant frequency and nodal pattern.

FIG. 2 depicts the acoustic driver assembly. The driver is assembled by first applying some silicone grease to the surfaces of a piezoelectric disk 5. The disk is then placed on a stud (not shown) followed by a brass sheet 6. Another disk 5 coated with silicone is then added. The directions of polarization must either point both toward the brass or both away from it. Three teflon sleeves 7 are used as insulators to insure that the piezoelectric disks 5 do not contact the stud.

This form of the driver is referred to as a Langevin sandwich. In power application it has a number of advantages over a single element design. One practical advantage is safety. The voltage required to power such a unit is sufficiently high to cause severe electrical shocks and burns. Therefore, it is desirable to expose as little of the unit connected to the high voltage. With this construction, the high voltage is connected only to the brass plate. The rest of the metal parts are connected to signal ground.

The power handling capacity of the piezoelectric element (such as PZT-4) depends on:
1. mechanical strength
2. mechanical loss
3. dielectric loss
4. electrical depolarization
5. thermal depolarization As with all elastic materials, the dynamic strain during the resonance of a piezoelectric element introduces stress. Most ceramics are weak in tension but strong in compression. PZT-4 has a tensile strength of about 10,000 psi but its compressive strength is about 75,000 psi. Prestress eliminates the danger of damaging the ceramic due to tension during operation.

Mechanical losses in the piezoelectric elements are very small compared to the dielectric losses and can be ignored for practical purposes. Electrical depolarization of PZT-4 occurs in an electric field of 1000 volts/mm or above. Even at field intensities below 1000 volts/mm electrical losses at frequencies above 20 kHz become prohibitive.

Therefore, dielectric losses and consequent thermal depolarization are the limiting factors for the power handling capacity of PZT-4. From these considerations, the compressional mode power handling capacity of PZT-4 is 5.6 watts/cm³/kHz, whereas about 95% of the electrical energy is transferred into mechanical energy. (See "Power Capacities of Piezoelectric Ceramics", D. Berlincourt, Clevite Corp. Technical Report #TP-221, 19-61).

Since the disk volume is calculated to be 4.87 cm³, and the elements are operated at about 37 kHz, each disk should be capable of handling $$w_{max}=(5.6)(4.87)(37)\approx 1 \text{ kilowatt.}$$

In an array consisting of 4 drivers each with 2 disks, the overall power capability of the degasser is 8 kilowatts. This number should be considered the absolute maximum. For safe, longlife, continuous operation, a safety factor should be applied. If one applies an arbitrary factor of two, then each disk can be safely operated at 500 watts.

Ideally at resonance, the system would have zero reactance and zero resistance. Actually this is not the case, because the PZT-4 elements are essentially two silver contact plates with a dielectric material between them which is a capacitance. In addition to the energy transferred to the liquid column, energy losses in the elements and in the steel components, in effect, cause the impedance to have some finite value. Thus, to achieve a very efficient system in which the maximum electrical power is transformed into mechanical power, two additional devices are needed between the power generator and the degasser. These are a transformer and an inductor. The inductance must tune out the capacitance of the driver array. The transformer is used to match the effective resistance of the degasser at resonance to the output resistance of the power amplifier.

The source of the acoustic power is an ENI Power Oscillator. This unit consists of low-level signal generator and a Class A power amplifier. The output resistance of the unit is 50ω.

Rather than measuring the capacitance and resistance of the degasser a more empirical approach is taken. An ENI "match-box" achieves the best match (see FIG. 3). This unit consists of a transformer, a series inductor and a second transformer. The values of these components are switch selectable. When the ratio of forward power to the load power equals one the system is perfectly matched. That is all the power being delivered by the generator is consumed by the load (degasser). This ratio cannot exceed one. The lower the ratio the poorer the match.

The values of the two transformers and series inductor are selected to achieve a match ratio of greater than 0.9 at the frequency of pipe resonance. The ratio is easily calculated by two meter readings on the front panel of the ENI: one forward power and one load power. From the switch positions on the match box, a transformer ratio and inductance can be calculated. A step-up transformer is used with a ratio of about two. An air core inductor is constructed to obtain the necessary inductance. As indicated in FIG. 3, the circuits are equivalent. The match is better than 0.9 at the design frequency with the transformer and inductor.

A Kaman Displacement Unit measures the performance of the unit (see FIG. 4). The micromanipulator is used to position the probe and for calibration. A bypass filter removes low frequency artifacts from random vibrations. The high frequency cut-off is set to remove ambient noise. Then the power is turned on and the system is tuned for resonance.

The peak-to-peak displacements are measured as a function of the power level. The data indicates that the displacement increases with increasing power. However, at higher power levels less of an increase in displacement occurs.

Figure 5A:
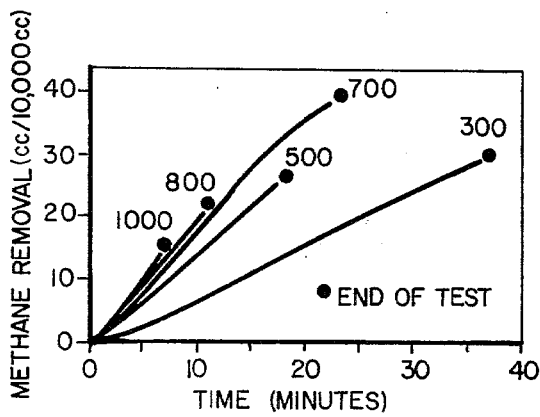
FIG. 5a graph depicts removal as a function of time.
Figure 5B:
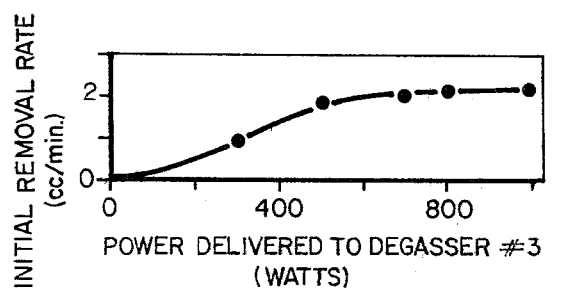
FIG. 5b graph depicts removal rate as a function of power.

One of the major controlling parameters of the rate of bubble growth from rectified diffusion is the ratio of acoustic pressure to ambient pressure. The greater the ratio above the threshold ratio the faster the bubble growth. The pressure ratio can be increased by increasing the acoustic pressure, accomplished by increasing the gain of the power oscillator. Therefore, to increase bubble growth the first parameter varied is the power level, and the results are shown in FIG. 5a. When more power is supplied the rate of removal increases as indicated by the initial slopes of the curves. The initial slope is plotted in FIG. 5b. The initial rate of removal increases continuously as the power level increases. However, as power increases further, the initial rate will tend to level off. Hence, while more power increases the removal rate, the increase is not proportional to the increase in power.

The driver arrays must be located at antinodes (positions of maximum amplitude of vibration at resonance) which are in phase. While a model of the vibration of the pipe can be used to estimate these locations, an empirical approach is taken. Since the center array is already mounted, the pipe can be driven at resonance to produce the node-antinode pattern along the pipe. To visualize this pattern, a slurry of water and powdered alumina oxide is applied to the surface of the pipe. The powder collects at the nodes (positions of zero amplitude vibration). The antinodes are located somewhere between the two adjacent at about midway. The off-center drivers are mounted on an antinode which is an even number of antinodes away from the center array.

Since the radial and longitudinal modes of vibration of a liquid column are highly coupled, there is a longitudinal pressure variation in addition to the radial variation. A standing wave in the longitudinal direction causes nodes along the axis. Thus bubbles tend to collect at these locations until they obtain sufficient buoyancy to rise to the surface. This "locking" of bubble positions is the phenomenon that investigators use to actually observe changes in the radius of a single bubble for nonflow cases.

To overcome this locking effect, power can be gated on and off instead of being continuously applied. The rationale was to have the power on long enough to allow significant bubble growth and off long enough to allow small bubbles at the bottom of the cylinder to rise to the top.

A series of tests were performed in which the cycle was fixed at one second and the on-time was varied from 1 econd (i.e., continuous operation) to 0.10 seconds. As suspected, the continuous operation did yield the most rapid removal rate. The curve with the 0.90 second on-time is nearly the same as the continuous case. A 50 percent duty cycle resulted in about 75 percent removal efficiency. Although the rate was not increased, less power was required.

EXAMPLE

The design of the pipe degasser is shown in FIG. 1. The pipe is a 4 ft. section of schedule 80, 4 inch diameter stainless steel pipe. Hubs were welded to each end of the pipe for convenient mounting. After the welding operations, the pipe section was hydrostatically tested to 2500 psi. One array of 4 drivers was mounted at the center of the pipe as shown in FIG. 1 and two more arrays were mounted at equal distances on either side of the center.

To select the length of masses 9 (see FIG. 2), experiments were run to tune the drivers to the pipe resonance. After a series of lengths were designed, each was machined and mounted. The designs varied by the assumptions made about the characteristic lengths of the sound paths. Each was driven to determine the resonance and the sharpness. Eventually, a length of 3.2 inches yielded the best results. Better transfer of energy occurs at various resonant frequencies of the pipe.

Thus, for a given power input, most degassing occurred at one of the resonances. The amount of the degassing was not equal at each resonance indicating some modes coupled more energy into the fluid column than others.

Figure 6:
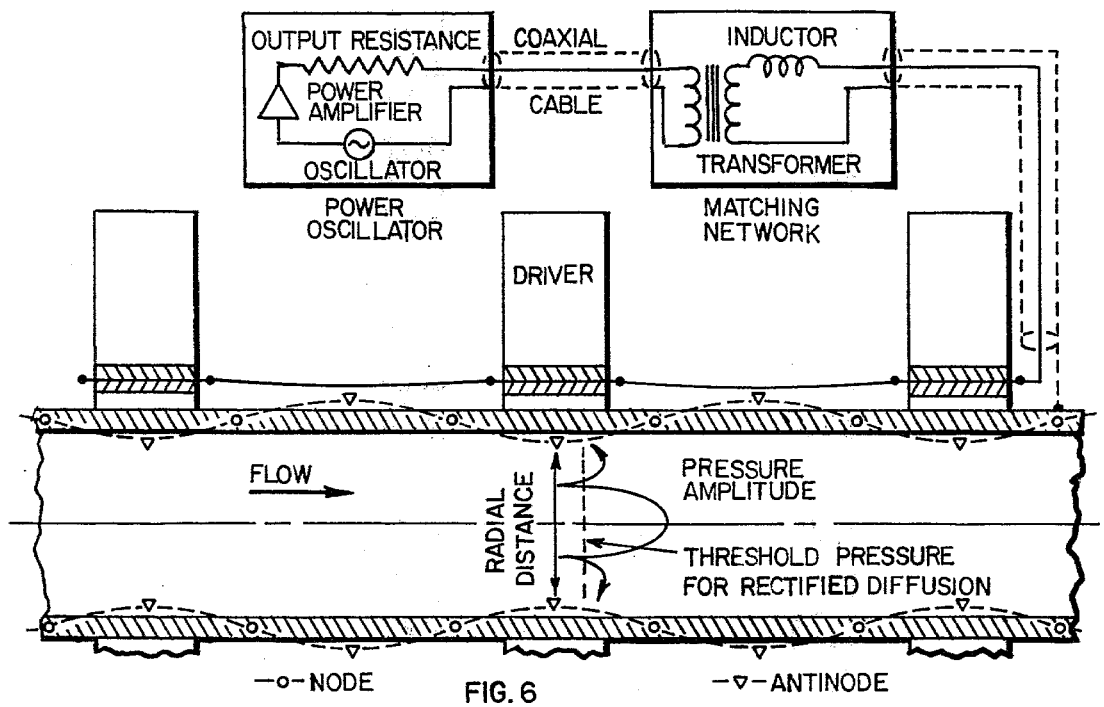
FIG. 6 depicts a schematic drawing of the overall design of a practical acoustic degasification unit including a section view of the hollow chamber.

The operation of the pipe degasser is depicted in FIG. 6. The design of a practical, effective degasser must promote efficient rectified diffusion in terms of recovery of the dissolved gas and the power required to produce the acoustic pressure variations. The major design considerations are:

To determine an effective frequency range to promote efficient rectified diffusion.

To select a hollow chamber that has a resonance in that frequency range and whose geometry is such that the fluid column is also resonant.

The acoustic field should be focused to the center line of the hollow chamber so that the peak intensity occurs at the center.

Cavitation at the walls should be avoided.

To determine the power level so that the greatest volume of fluid undergoes rectified diffusion with the least amount of energy.

The acoustic drivers must be tuned to the hollow chamber resonance to keep overall efficiency high.

For parallel multi-driver arrays along the hollow chamber, the drivers must be mounted at antinodes that are in phase.

The output resistance of the power oscillator must be matched to the effective resistance of the system at resonance.

An inductor must be inserted between the oscillator and drivers to tune out the capacitance of the piezoelectric elements.

Figure 7:
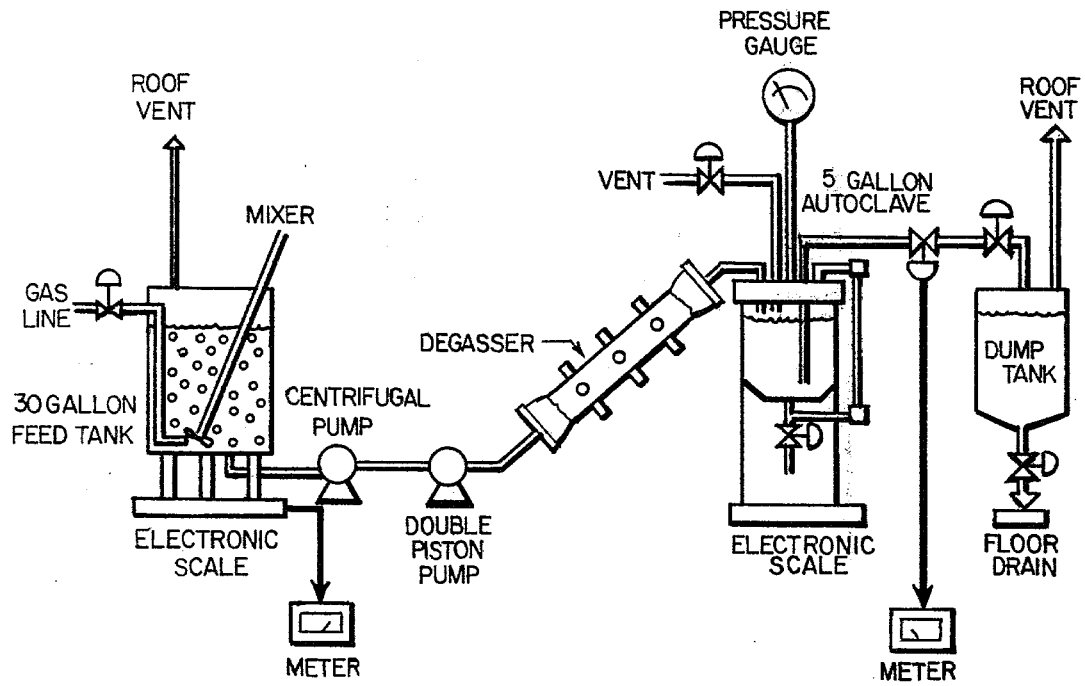
FIG. 7 is the basic configuration of the test facility used in the flow experiment.

The basic equipment layout is shown in FIG. 7. The degassing unit was supported overhead at an angle from the floor of about 45°. The inlet to the degasser was connected to a series of pumps and the output was connected to the top of a 5 gallon autoclave.

The samples for the flow test were prepared in a 30 gallon feed tank. A cover sealed the tank. A mixer sat above the tank and the shaft entered through a rubber seal in the cover. House methane entered the tank from the bottom through a ⅛ in. diameter copper pipe. The opening of the pipe was just below the blades of the mixer. An additional pipe connection was added to the cover to remove excess methane through a roof vent. To prepare the sample, the tank was filled initially with city water. The valve on the methane line was then opened. Both the mixer and blower of the roof vent were turned on. The methane then bubbled through the liquid for 2 to 4 hours.

At the bottom of the tank was the outlet connected to a centrifugal pump. The outlet of this pump was connected to additional piston pumps. The pumps were connected to the degasser through ½ in. diameter pipe. The outlet of the degasser was then connected through a short section of pipe (10 in.) to the 5 gallon autoclave, which served as a gas-liquid separator.

Several connections were made to the autoclave. A pressure gauge was connected to the top. A drain line issued from the bottom and was connected to a control valve. A manual valve was also connected to the bottom of the autoclave for sampling. The output of the control valve was connected to a 100 gallon dump tank through a manual ball valve. A cover was added to the dump tank to seal it. A connection to the roof vent was made to remove free methane. A manual valve at the bottom was occasionally opened to empty the tank through a floor drain.

The feed tank stood on an electronic scale, which could offset the tare weight. When the tank was full, the weight was about 260 lbs. The time and weight were noted at several intervals during an experiment. From this data, the mass and corresponding volume flow rates were calculated.

The pressure of the system was controlled by the manual ball valve between the control valve and dump tank. This adjustment was made with water flowing through the system prior to an actual experimental run.

A gas chromatograph was used to determine the amount of gas removed from the liquid. The chromatograph had to be adjusted for water, methane and sample size. This was an interactive procedure. The chromatograph settings and the sample size were varied until sufficient sensitivity of the output was obtained with as small a sample as possible.

The autoclave was drained through the valve at the bottom, and just before the start of the experiment a sample of the feed tank was taken. The pumps were then turned on and 100 lbs. (about 12 gallons) were pumped through the system. A second sample was then taken at the bottom of the autoclave. The pump was then turned off and the system drained. The power to the acoustic degasser was turned on. For the experiment 1000 watts of acoustic power was supplied only to the top array. This array was selected since it was closest to the autoclave and therefore only minimal reabsorption could occur before phase separation in the autoclave. After the degasser was tuned to resonance, another 100 pounds of the sample was pumped through the system. A third sample was taken and processed in the chromatograph.

The feed tank sample contained the most methane. The sample obtained after flowing through the system without the acoustic contains less methane. Thus, some methane was liberated just by pumping the liquid through the system. With the degasser on, the least amount of methane was contained in the liquid. The two values listed for each case were obtained from two analyses of each sample. The only difference between the first set of readings and the second set of readings was that the second readings were made minutes after the first set of readings. The average result shows an almost two-fold increase in the methane liberated when the acoustic power is on compared to when the power is off.

The differences in the chromatograph results are undesirable. Yet for the three samples there does seem to be a consistent trend. The second test results are lower than the first in all three cases. This indicates that methane is slowly being released from the sample. The processing time for the chromatograph is roughly 30 to 60 minutes and the entire experiment lasts only 30 minutes. Thus, some samples must be processed in 1 or 2 hours after the experiment has been completed. The methane in the sample will be less than when it was obtained.

FLOW DATA

Test Conditions:

| | |
|---|---|
| Temperature | 68 F |
| Pressure | 10 psig |
| Power | 1000 watts |
| Transducers | Top array |
| Flow | 1 gal/min |
| Gas Chromatograph Sample size | 1000 µ liter |

RESULTS

| SAMPLE | GAS CHROMATOGRAPH READINGS | | % REMOVAL | |
|---|---|---|---|---|
| | FIRST | SECOND | FIRST | SECOND |
| Feed Tank | 30.0 | 16.5 | — | — |
| Autoclave Without acoustics | 14.0 | 11.5 | 53% | 30% |
| Autoclave | 5.5 | 4.0 | 82% | 76% |

It is not intended herein to mention all of the possible equivalent forms of the invention. It is to be understood that the terms used herein are merely description rather than limiting. It is herein understood that although the present invention has been specifically disclosed with preferred embodiments, and examples, many other modifications and variations of the concepts herein disclosed may be resorted to by those skilled in the art, which are considered to be within the scope of the invention and the appended claims.

We claim:

1. A method of separating a dissolved gas from a liquid, which comprises:
    (a) providing a hollow chamber with at least one acoustic transducer attached thereto on the outer surface at a first antinodal point;
    (b) introducing a liquid containing a dissolved gas into the hollow chamber;
    (c) tuning said at least one acoustic transducer to be in resonance with the hollow chamber containing the liquid, and with a transducer power supply;
    (d) focusing acoustic energy from said at least one acoustic transducer so that peak intensity occurs near the center of the hollow chamber, thereby avoiding cavitation damage on the inside surface of the hollow chamber;
    (e) vibrating the hollow chamber by means of the acoustic energy thereby causing bubbles of the dissolved gas to form and grow in the liquid; and
    (f) separating the bubbles from the liquid.

2. The method as recited in claim 1 wherein the acoustic transducer energy is shut down intermittently.

3. The method of separating a dissolved gas from a liquid as recited in claim 1, further comprising: attaching at least one additional acoustic transducer to the hollow chamber at an additional antinodal point of the hollow chamber, each said additional antinodal point being in the same phase as the first antinodal point.

4. A method of separating a dissolved gas from a liquid which comprises:
    (a) providing a hollow pipe having an acoustic transducer attached thereto at an antinodal point in a plane that is perpendicular to the direction of fluid flow into the pipe and spaced about the circumference and further including additional acoustic transducers being located at additional antinodal points and in phase with all the transducers;
    (b) introducing a continuous flowing liquid containing at least one dissolved gas into the hollow pipe;
    (c) tuning each of said acoustic transducers to be in resonance with the hollow pipe containing the flowing liquid and with a transducer power supply;
    (d) focusing the acoustic energy from each of said acoustic transducers so that peak intensity occurs near the center of the hollow pipe, thereby avoiding cavitation damage on the inside surface of the hollow pipe;
    (e) vibrating the hollow pipe by means of the acoustic energy thereby causing bubbles of at least one dissolved gas to form and grow in the flowing liquid; and
    (f) separating the bubbles from the liquid.

5. A method of separating a dissolved gas from a liquid, using a series of hollow chambers having both an inside surface and an outside surface, which comprises:
    (a) providing more than one hollow chamber in a series, with at least one acoustic transducer attached to each hollow chamber on the outside surface at a first antinodal point;
    (b) introducing a liquid containing a dissolved gas into the series of hollow chambers,
    (c) tuning said at least one acoustic transducer to be in resonance with the hollow chamber to which the at least one transducer is attached while containing the liquid, and with a transducer power supply;
    (d) focusing acoustic energy from said at least one acoustic transducer so that peak intensity occurs near the center of the series of hollow chambers, thereby avoiding cavitation damage on the inside surfaces of the series of hollow chambers;
    (e) vibrating the series of hollow chambers by means of the acoustic energy thereby causing bubbles of the dissolved gas to form and grow in the liquid; and
    (f) separating the bubbles from the liquid.

6. The method of separating a dissolved gas from a liquid as recited in claim 5, further comprising:
    attaching at least one additional acoustic transducer to each of the hollow chambers, at additional antinodal points of each of the hollow chambers, each said additional antinodal point being in the same phase as the first antinodal point.

7. The method of separating a dissolved gas according to claim 1 wherein said liquid contains a second dissolved gas comprising: subjecting the liquid having the first gas separated therefrom to steps "a" through "f" of claim 1 at different operating parameters so as to remove the second dissolved gas.

* * * * *